(12) United States Patent
Tatsuno et al.

(10) Patent No.: US 7,513,110 B2
(45) Date of Patent: Apr. 7, 2009

(54) CONTROL APPARATUS OF CONSTRUCTION MACHINE AND METHOD FOR CALCULATING INPUT TORQUE

(75) Inventors: Yukihiro Tatsuno, Tsukuba (JP); Hidetoshi Satake, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 360 days.

(21) Appl. No.: 10/529,219

(22) PCT Filed: Sep. 26, 2002

(86) PCT No.: PCT/JP02/09967

§ 371 (c)(1), (2), (4) Date: Mar. 25, 2005

(87) PCT Pub. No.: WO2004/029460

PCT Pub. Date: Apr. 8, 2004

(65) Prior Publication Data
US 2006/0056978 A1 Mar. 16, 2006

(51) Int. Cl.
*F16D 31/02* (2006.01)
*F04B 49/00* (2006.01)

(52) U.S. Cl. .............................. 60/449; 417/22; 417/34; 417/42

(58) Field of Classification Search ................... 417/42, 417/22, 218, 34; 60/451, 449
See application file for complete search history.

(56) References Cited
U.S. PATENT DOCUMENTS
4,332,531 A * 6/1982 Marietta ..................... 417/218

| 4,904,161 | A | * | 2/1990 | Kamide et al. | ................. | 417/22 |
| 5,155,996 | A | * | 10/1992 | Tatsumi et al. | ................. | 60/431 |
| 5,269,391 | A | * | 12/1993 | Ito et al. | ..................... | 180/197 |
| 5,307,631 | A | * | 5/1994 | Tatsumi et al. | ................. | 60/452 |
| 6,010,309 | A | * | 1/2000 | Takamura et al. | ............. | 417/22 |

FOREIGN PATENT DOCUMENTS

| JP | 63-18035 | B2 | | 4/1988 |
| JP | 2633095 | B2 | * | 9/1992 |
| JP | 2633095 | B2 | | 4/1997 |
| JP | 10131867 | A | * | 5/1998 |
| JP | 2000-161302 | | * | 6/2000 |
| JP | 3241062 | B2 | | 10/2001 |

* cited by examiner

*Primary Examiner*—Charles G Freay
(74) *Attorney, Agent, or Firm*—Oliff & Berridge, PLC

(57) ABSTRACT

A control apparatus of a construction machine includes a hydraulic pump driven by a prime mover, a hydraulic actuator, and a rotation speed detection device for detecting an actual rotation speed of the prime mover. The control apparatus includes a prime mover control device for controlling a rotation speed of the prime mover, and an input torque control device for adjusting an input torque for the hydraulic pump based on a deviation between the actual rotation speed detected by the rotation speed detection device and a control rotation speed set through an operation of the operating device, and the input torque control device executes control to decrease the input torque if the control rotation speed is greater than the actual rotation speed and the deviation calculated by subtracting the control rotation speed from the actual rotation speed is smaller than a predetermined negative value.

13 Claims, 8 Drawing Sheets

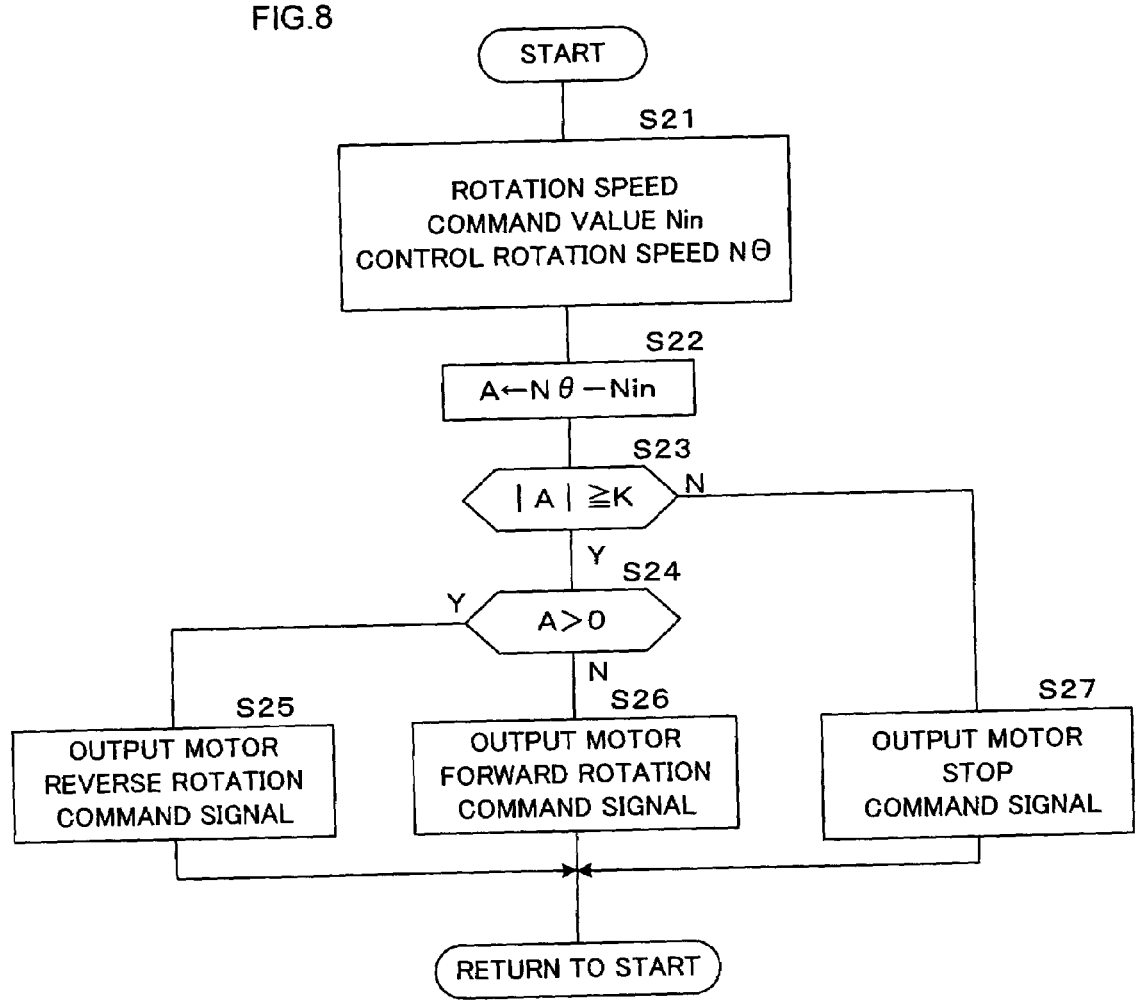

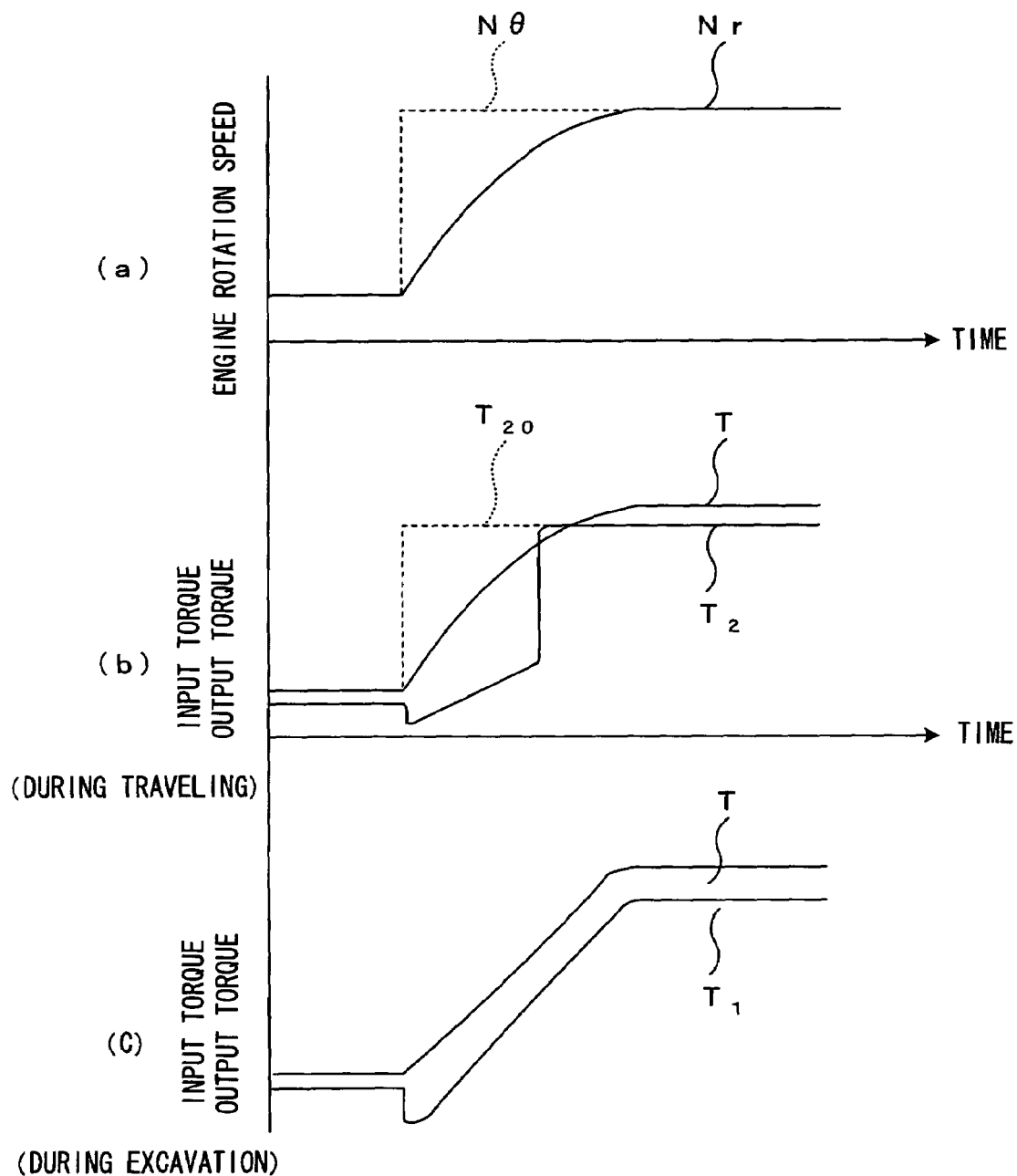

CONTROL APPARATUS OF CONSTRUCTION MACHINE AND METHOD FOR CALCULATING INPUT TORQUE

TECHNICAL FIELD

The present invention relates to a control apparatus of a construction machine that controls an input torque that affects a prime mover of the construction machine and to a method for calculating the input torque.

BACKGROUND ART

Construction machines known in the related art include the one disclosed in, for instance, Japanese Patent No. 2633095, which has a traveling hydraulic motor driven with the discharged oil from a variable displacement hydraulic pump which is driven by an engine, and is capable of controlling an engine rotation speed in response to an operation of a travel pedal as well as allowing the vehicle to travel by controlling the quantity of the pressure oil supplied to the hydraulic motor in response to the operation of the travel pedal.

In the construction machine disclosed in the above-mentioned publication, the input torque is controlled on the basis of the following speed sensing control. That is, a target torque to prevent an engine stall is calculated based on a deviation between an actual engine rotation speed detected by a rotation speed sensor and a target rotation speed corresponding to a position of a governor lever of the engine, and then a target pump displacement angle is calculated based on the target torque so as to control the pump displacement angle. When calculating the target torque, the operation is executed only to increase the input torque but not to decrease the input torque. In this manner, the displacement angle of the hydraulic pump is maintained greater than or equal to a predetermined value, and as a result, smooth acceleration can be secured.

In recent years, engines designed to handle exhaust gas have been used in order to suppress the generation of black smoke. In the engine designed to handle exhaust gas, the full load performance curve is set such that the engine output torque in the low speed range is smaller than a value for conventional engines. More particularly, the maximum output torque of the engine is shifted to the high speed range, and the torque is increased gradually from the low speed range to the middle speed range whereas the torque is increased sharply from the middle speed range to the high speed range. As a result, the fuel consumption in the low speed range can be reduced so as to suppress the generation of black smoke.

The following problems would occur if the input torque was controlled as described in the above-mentioned publication with such an engine that copes with exhaust gas. That is, since the input torque is not controlled to decrease in the construction machine according to the above-mentioned publication, the input torque may exceed the engine output torque when the vehicle is starting traveling or climbing uphill and the travel load becomes greater, which may cause an engine stall to occur.

DISCLOSURE OF THE INVENTION

An object of the present invention is to provide a control apparatus of a construction machine suitable for being employed with an engine designed to cope with exhaust gas, and a method for calculating an input torque.

The present invention is adopted in a construction machine having a variable displacement hydraulic pump driven by a prime mover, a hydraulic actuator driven with pressure oil discharged from the hydraulic pump, and a rotation speed detection means for detecting an actual rotation speed of the prime mover. A control apparatus of this construction machine includes a prime mover control means for controlling a rotation speed of the prime mover in accordance with an extent to which the operating means is operated, and an input torque control means for adjusting an input torque for the hydraulic pump based on a deviation between the actual rotation speed detected by the rotation speed detection means and a control rotation speed set through an operation of the operating means, and executes control to decrease the input torque if the control rotation speed is greater than the actual rotation speed and the deviation between them is larger than or equal to a predetermined value.

Furthermore, a control apparatus of the construction machine includes a prime mover control means for controlling a rotation speed of the prime mover in accordance with an extent to which the operating means is operated, and an input torque control means for adjusting an input torque for the hydraulic pump based on a deviation between the actual rotation speed detected by the rotation speed detection means and a control rotation speed set through an operation of the operating means, and if the control rotation speed is greater than the actual rotation speed and the deviation between them is larger than or equal to a predetermined value, control is executed to decrease the input torque by an amount which is greater than an amount set when the deviation is below the predetermined value.

In this manner, an engine stall can be prevented and excellent acceleration can be achieved, and thus the control apparatus is suitable for being used with an engine designed to cope with exhaust gas.

It is preferable that an adjustment amount of the input torque is set to zero if the control rotation speed is greater than the actual rotation speed and the deviation between them is below the predetermined value. If the control rotation speed is greater than the actual rotation speed and the deviation between them is larger than or equal to the predetermined value, a rate of change of the input torque may be set greater than a rate of change of the input torque set when the control rotation speed is smaller than the actual rotation speed.

It is possible for the hydraulic actuator to be a hydraulic motor for traveling and for the operating means to be a travel pedal. The input torque during non-traveling may be decreased by an amount which is greater than an amount set during traveling.

The present invention is ideal in an application in a wheeled hydraulic excavator.

An input torque may be calculated by calculating a standard torque in correspondence with a deviation between a control rotation speed and an actual rotation speed of the prime mover, setting a correction torque to zero if the control rotation speed is greater than the actual rotation speed and the deviation between them is smaller than or equal to a predetermined value, but setting the correction torque to a negative value if the deviation is larger than the predetermined value, and adding the correction torque to the standard torque.

BRIEF DESCRIPTION OF THE DRAWINGS

FIG. 8 presents a flowchart of the control procedure of the engine rotation speed; and FIG. 9 shows diagrams illustrating operational characteristics achieved by the control apparatus according to the embodiment of the present invention.

BEST MODE FOR CARRYING OUT THE INVENTION

An embodiment achieved by adopting a control apparatus of a construction machine according to the present invention in a wheeled hydraulic excavator is explained in reference to FIGS. 1 through 9.

Figure 1:
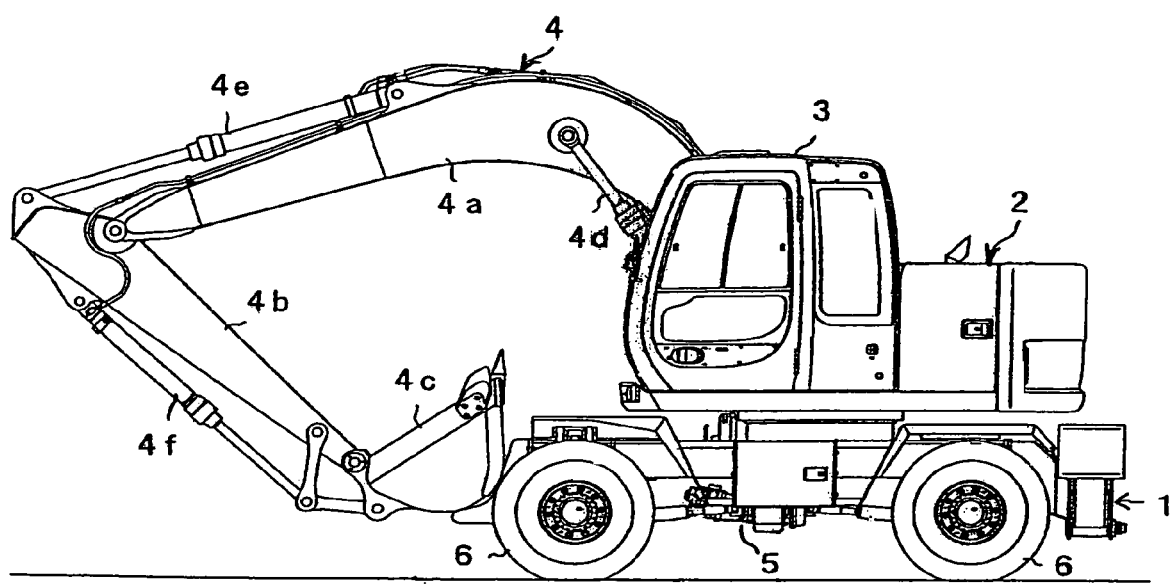
FIG. 1 is an external view of an embodiment of a wheeled hydraulic excavator in which the present invention is adopted.

As shown in FIG. 1, the wheeled hydraulic excavator includes an undercarriage 1 and a revolving superstructure 2 rotatably mounted atop the undercarriage 1. An operator's cab 3 and a work front attachment 4 constituted with a boom 4a, an arm 4b and a bucket 4c are provided at the revolving superstructure 2. The boom 4a is raised/lowered as a boom cylinder 4d is driven, the arm 4b is raised/lowered as an arm cylinder 4e is driven and the bucket 4c is engaged in a dig/dump operation as a bucket cylinder 4f is driven. A traveling hydraulic motor 5, which is hydraulically driven, is provided at the undercarriage 1, and the rotation of the traveling motor 5 is transmitted to wheels 6 (tires) via a drive shaft and an axle.

Figure 2:
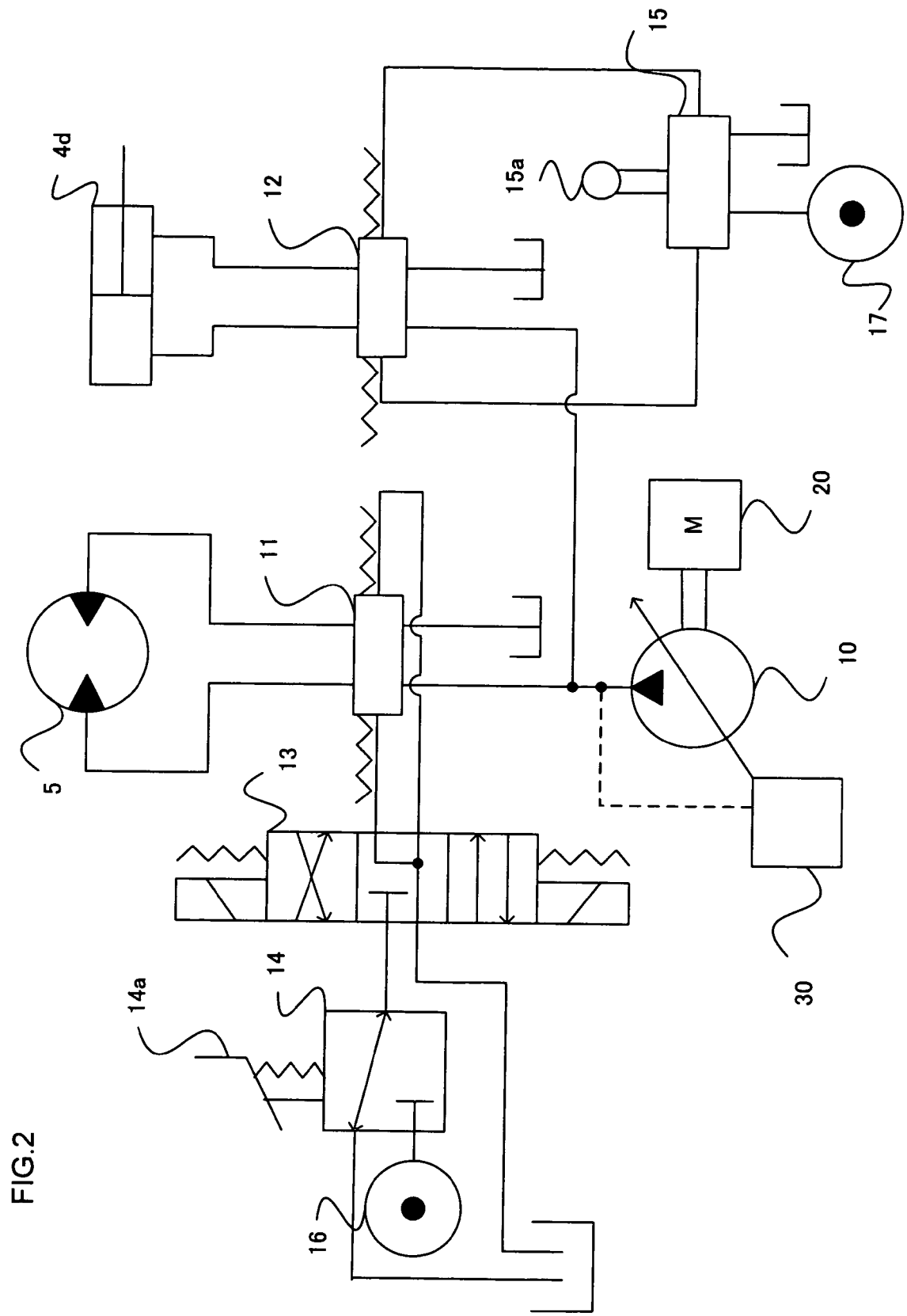
FIG. 2 is a circuit diagram of a hydraulic circuit of a control apparatus achieved in an embodiment of the present invention.
Figure 3:
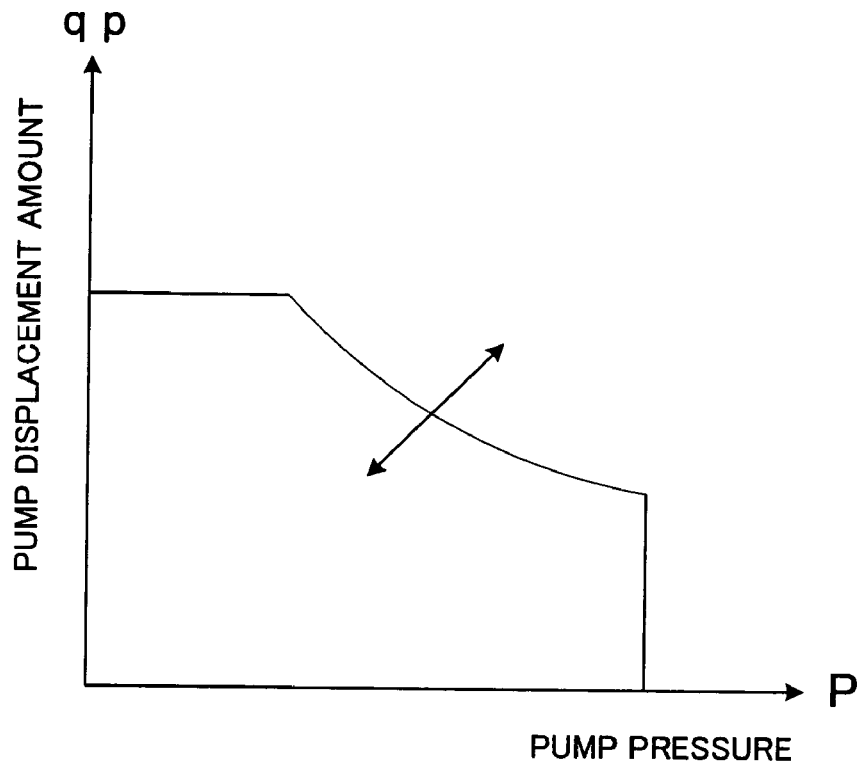
FIG. 3 is a diagram of P-qp curve of a variable displacement hydraulic pump.

FIG. 2 shows a hydraulic circuit for traveling and for work. A variable displacement hydraulic pump 10 is connected with the hydraulic motor 5 via a control valve 11, and with a hydraulic cylinder, for instance, the boom cylinder 4d via a control valve 12. Pilot ports of the control valve 11 are connected with a pilot valve 14 via a forward/backward switching valve 13 whereas pilot ports of the control valve 12 are connected with a pilot valve 15.

The forward/backward switching valve 13 is switched through an operation of a switch not shown in the figure, and the pilot valve 14 is operated in accordance with an extent to which a travel pedal 14a is depressed. As the forward/backward switching valve 13 is set to a forward position or a backward position through a switch operation and then the travel pedal 14a is operated, a pilot pressure originating from a hydraulic source 16 is applied to the control valve 11. In response, the pressure oil is supplied from the hydraulic pump 10 to the hydraulic motor 5 as the control valve 11 is operated and then the hydraulic motor 5 rotates to allow the vehicle to travel forward or backward.

On the other hand, the pilot valve 15 is operated according to an extent to which an operating lever 15a is operated. A pilot pressure from a hydraulic source 17 is applied to the control valve 12 as the operating lever 15a is operated. As the control valve 12 is operated, the pressure oil from the hydraulic pump 10 is supplied to the boom cylinder 4d so as to enable the work operation, for instance, the excavation with the boom cylinder 4d being driven.

The hydraulic pump 10 is driven with an engine 20, and a pump displacement angle qp is changed with a regulator 30. The discharged oil pressure from the pump is fed back to the regulator 30 so as to execute the horsepower control. The horsepower control is a so-called P-qp (pressure to pump displacement angle) control shown in FIG. 3. In addition, the pump displacement amount pq is also controlled in accordance with an input torque which is calculated through the speed sensing control to be detailed later in the present embodiment. Accordingly, the input torque is increased or decreased as indicated by arrows shown in FIG. 3.

Figure 4:
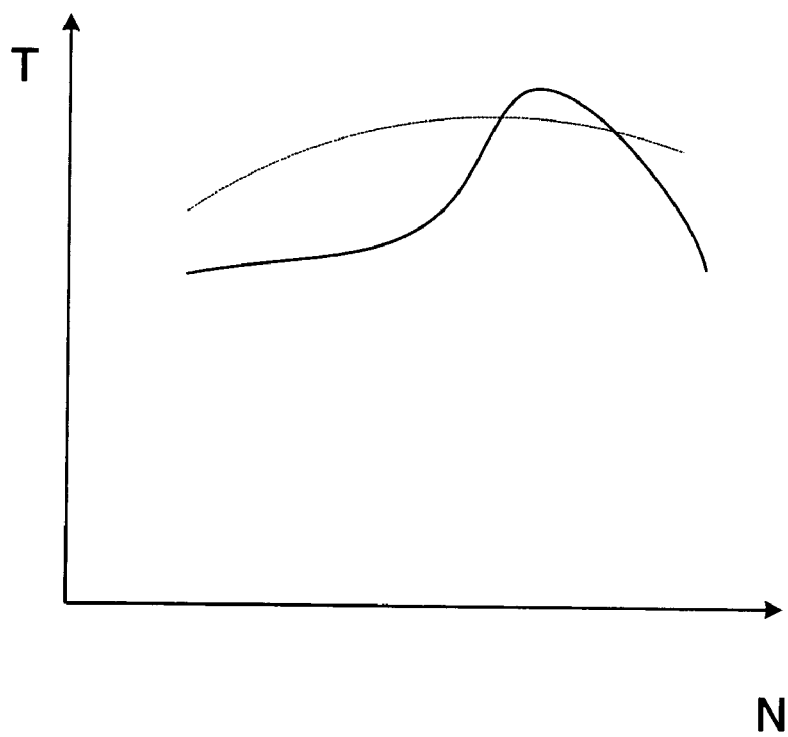
FIG. 4 shows a full load performance curve of an engine used in the embodiment of the present invention.

In this embodiment, the engine designed to cope with exhaust gas is used so as to suppress the generation of black smoke. FIG. 4 shows characteristic diagrams of engine full load performance curves with characteristics of the engine coping with the exhaust gas being indicated with a solid line and characteristics of other type of engine being indicated with a dotted line. The engine coping with the exhaust gas is designed such that an output torque T in the low speed range is small as shown in FIG. 4. More particularly, a maximum output torque is shifted to the high speed range, and the torque is set to increase gradually from the low speed range to the middle speed range but to increase sharply from the middle speed range to the high speed range. The fuel consumption in the low speed range can be lowered by using the engine with such characteristics, and the generation of black smoke can be reduced.

Figure 5:
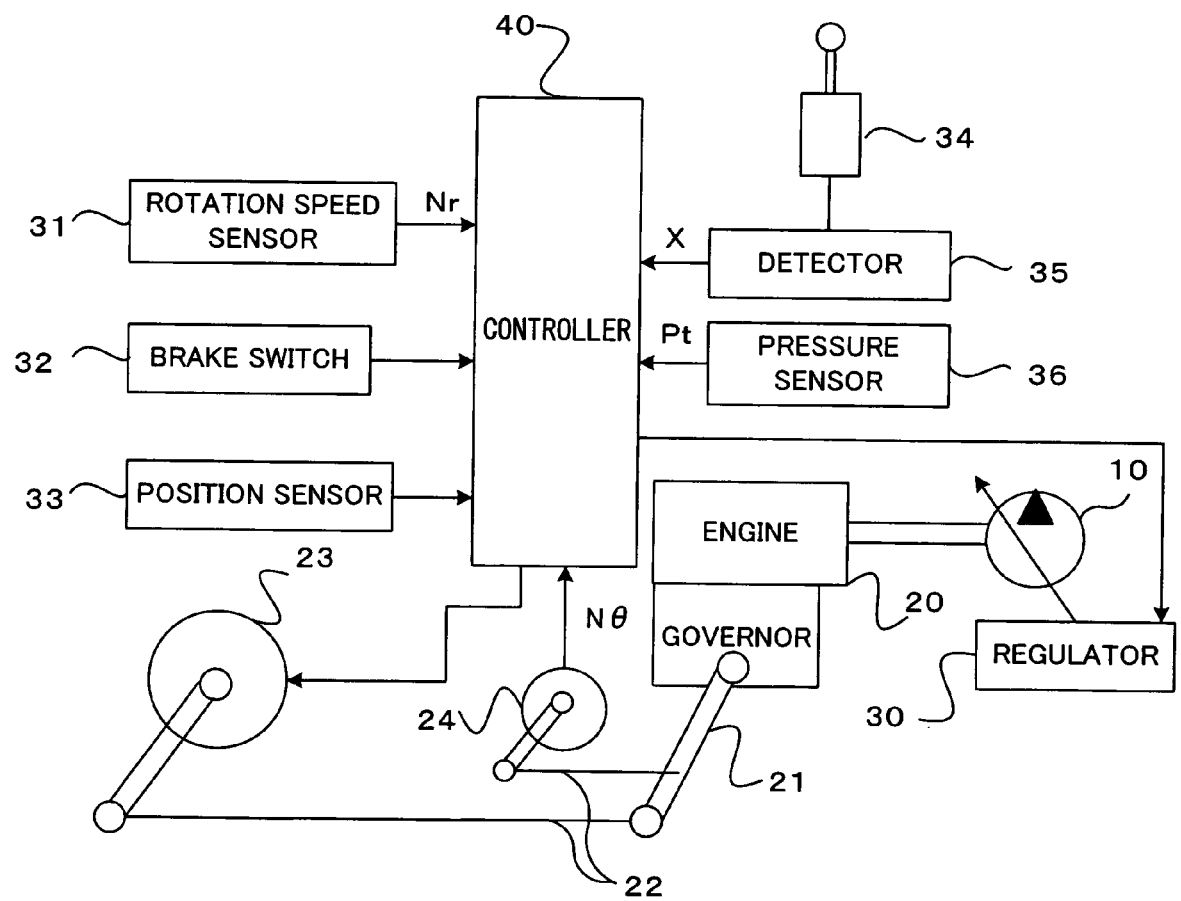
FIG. 5 is a block diagram of the control apparatus according to the embodiment of the present invention.

FIG. 5 is a block diagram of the control apparatus according to the present embodiment. A governor lever 21 of the engine 20 is connected to a pulse motor 23 via a link mechanism 22 and the engine rotation speed is adjusted with the rotation of the pulse motor 23. Namely, the engine rotation speed increases as the pulse motor 23 rotates forward, and the engine rotation speed decreases with a reverse rotation of the pulse motor 23. The rotation of the pulse motor 23 is controlled by a control signal from a controller 40 as described later. A potentiometer 24 is connected to the governor lever 21 via the link mechanism 22, and the governor lever angle corresponding to the rotation speed of the engine 20, which is detected with the potentiometer 24, is input to the controller 40 as an engine control rotation speed Nθ.

A rotation speed sensor 31 that detects an actual rotation speed Nr of the engine 20, a brake switch 32, a position sensor 33 that detects the position to which the forward/backward switching valve 13 is switched, a detector 35 that detects an extent X to which an operation member, i.e., a fuel lever 34 for instructing the engine rotation speed is operated, and a pressure sensor 36 that detects a pilot pressure Pt representing the extent to which the travel pedal 14a is depressed are also connected to the controller 40.

As the brake switch 32 is switched to a traveling position, a work position or a parking position, a work or traveling signal is output from the brake switch 32. When the brake switch 32 is switched to the traveling position, a parking brake is canceled and the operation of a service brake is enabled through a brake pedal. As the brake switch 32 is switched to the work position, the parking brake and the service brake are both engaged. When it is switched to the parking position, the parking brake is engaged. As the brake switch 32 is switched to the traveling position, it outputs an on signal, whereas it outputs an off signal when it is switched to the work or parking position.

Figure 6:
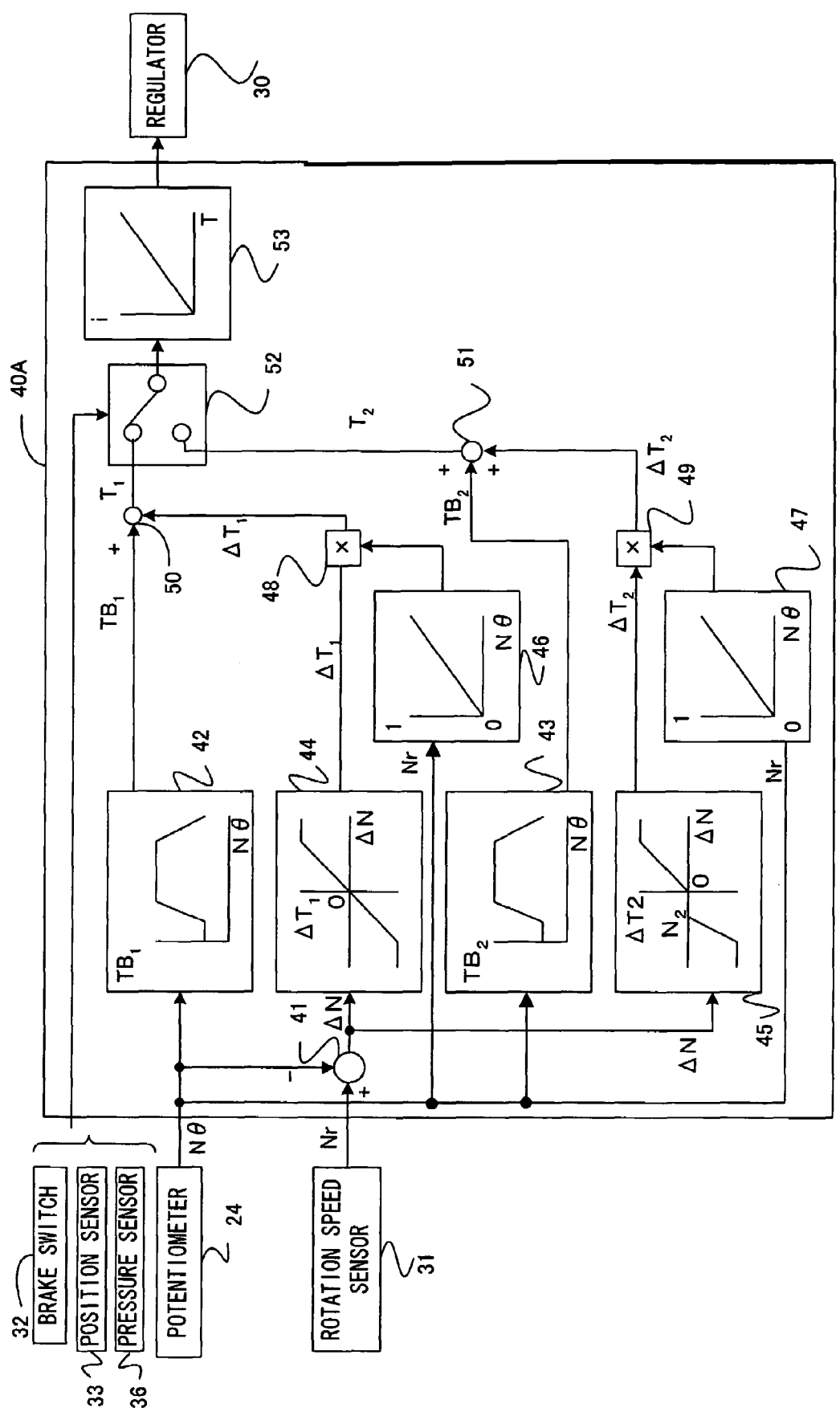
FIG. 6 shows in detail a control circuit for an input torque.

The controller 40 includes a torque control unit 40A for controlling the input torque and a rotation speed control unit 40B for controlling the engine rotation speed. FIG. 6 is a conceptual diagram illustrating in detail the torque control unit 40A.

The torque control unit 40A includes a deviation calculation unit 41 that calculates a deviation ΔN between the actual engine rotation speed Nr and the control rotation speed Nθ, standard torque calculation units 42 and 43 that calculate standard torques TB1 and TB2 respectively, correction torque calculation units 44 and 45 that calculate correction torques ΔT1 and ΔT2 respectively, coefficient calculation units 46 and 47 that each calculate a coefficient, multiplication units 48 and 49 that multiply the correction torques $\Delta T1$ and $\Delta T2$ by the coefficients respectively, adding units 50 and 51 that calculate target input torques T1 and T2 by adding the multiplied correction torques $\Delta T1$ and $\Delta T2$ to the standard torques T1 and T2 respectively, a selection unit 52 that selects one of the target input torques T1 and T2, and a converting unit 53 that outputs a control signal i for adjusting the input torque to the selected target input torque T1 or T2.

Characteristics suited for work are each set in advance at the standard torque calculation unit 42, the correction torque calculation unit 44 and the coefficient calculation unit 46, and characteristics suited for traveling are each set in advance at the standard torque calculation unit 43, the correction torque calculation unit 45 and the coefficient calculation unit 47.

Arithmetic operations executed at the torque control unit 40A are now explained in detail.

The deviation calculation unit 41 calculates the deviation $\Delta N$ (=$Nr-N\theta$) between the engine actual rotation speed $Nr$ detected by the rotation speed sensor 31 and the control rotation speed $N\theta$ detected by the potentiometer 24, and the deviation $\Delta N$ thus calculated is inputted to the correction torque calculation units 44 and 45. The relationships between the deviation $\Delta N$ and each of the correction torques $\Delta T1$ and $\Delta T2$ are stored in memory in advance at the correction torque calculation units 44 and 45 respectively as shown in the figure, and the correction torques $\Delta T1$ and $\Delta T2$ matching the deviation $\Delta N$ are individually calculated based upon the characteristics of these relationships.

The characteristics set in the correction torque calculation unit 44 indicate that the correction torque A T1 has a positive value when the deviation $\Delta N$ is positive and the correction torque $\Delta T1$ increases proportionally as the deviation $\Delta N$ increases. The correction torque $\Delta T1$ is set to be a negative value when the deviation $\Delta N$ is negative and the correction torque $\Delta T1$ decreases (or |$\Delta T1$| increases) proportionally as the deviation $\Delta N$ decreases. The inclination of the characteristics with the deviation $\Delta N$ being a positive value is equivalent to the inclination of the characteristics when the deviation $\Delta N$ is a negative value.

The characteristics set in the correction torque calculation unit 45 indicate, on the other hand, that the correction torque $\Delta T2$ has a positive value when the deviation $\Delta N$ is positive and the correction torque $\Delta T2$ increases proportionally as the deviation $\Delta N$ increases. Contrary to this, when the deviation $\Delta N$ is a negative value and in the range between 0 and a predetermined value N2, the correction torque $\Delta T2$ is 0, and if the deviation $\Delta N$ is smaller than the predetermined value N2, the correction torque $\Delta T2$ decreases proportionally as the deviation $\Delta N$ decreases. The inclination of the characteristics with the deviation $\Delta N$ being smaller than the predetermined value N2 is steeper than the inclination of the characteristics when the deviation $\Delta N$ is positive.

The relationships between the control rotation speed $N\theta$ and each of the standard torques TB1 and TB2 are stored in memory in advance at the standard torque calculation units 42 and 43 respectively as shown in the figure, and the standard torques TB1 and TB2 matching the control rotation speed $N\theta$ are individually calculated based upon the characteristics of these relationships. The characteristics in which the coefficients increase in proportion to the control rotation speed $N\theta$ are stored in memory in advance at the coefficient calculation units 46 and 47 as shown in the figure, and the coefficients matching the control rotation speed $N\theta$ are calculated based upon these characteristics. The multiplication units 48 and 49 multiply the correction torques $\Delta T1$ and $\Delta T2$ calculated at the correction torque calculation units 44 and 45 by the coefficients calculated at the coefficient calculation units 46 and 47 respectively.

The adding units 50 and 51 calculates the target input torques T1 and T2 by adding the correction torques $\Delta T$ multiplied at the multiplication units 48 and 49 to the standard torques TB1 and TB2 calculated at the standard torque calculation units 42 and 43 respectively.

The selection unit 52 makes a decision as to whether or not the vehicle is traveling based on the signals provided from the brake switch 32, the position sensor 33 and the pressure sensor 36. If the brake switch 32 has been turned off, the forward/backward switching valve 13 is set to a position other than the neutral position and the pilot pressure Pt is greater than a predetermined value, it is decided that the vehicle is traveling, otherwise, it is decided the vehicle is not traveling. The target input torque T2 is selected if the vehicle is traveling, and the target input torque T1 is selected when the vehicle is not traveling, for instance, when it is engaged in work operations.

The converting unit 53 calculates a control signal i corresponding to the selected target input torque T1 or T2. A cylinder for regulating the displacement angle and a solenoid valve for controlling the flow of pressure oil to the cylinder are mounted at the pump regulator 30 although not shown in the figures, and the control signal i outputted from the converting unit 53 is sent to this solenoid valve. In response, the pump displacement angle qp changes so as to regulate the input torque to the target input torque T1 or T2.

Figure 7:
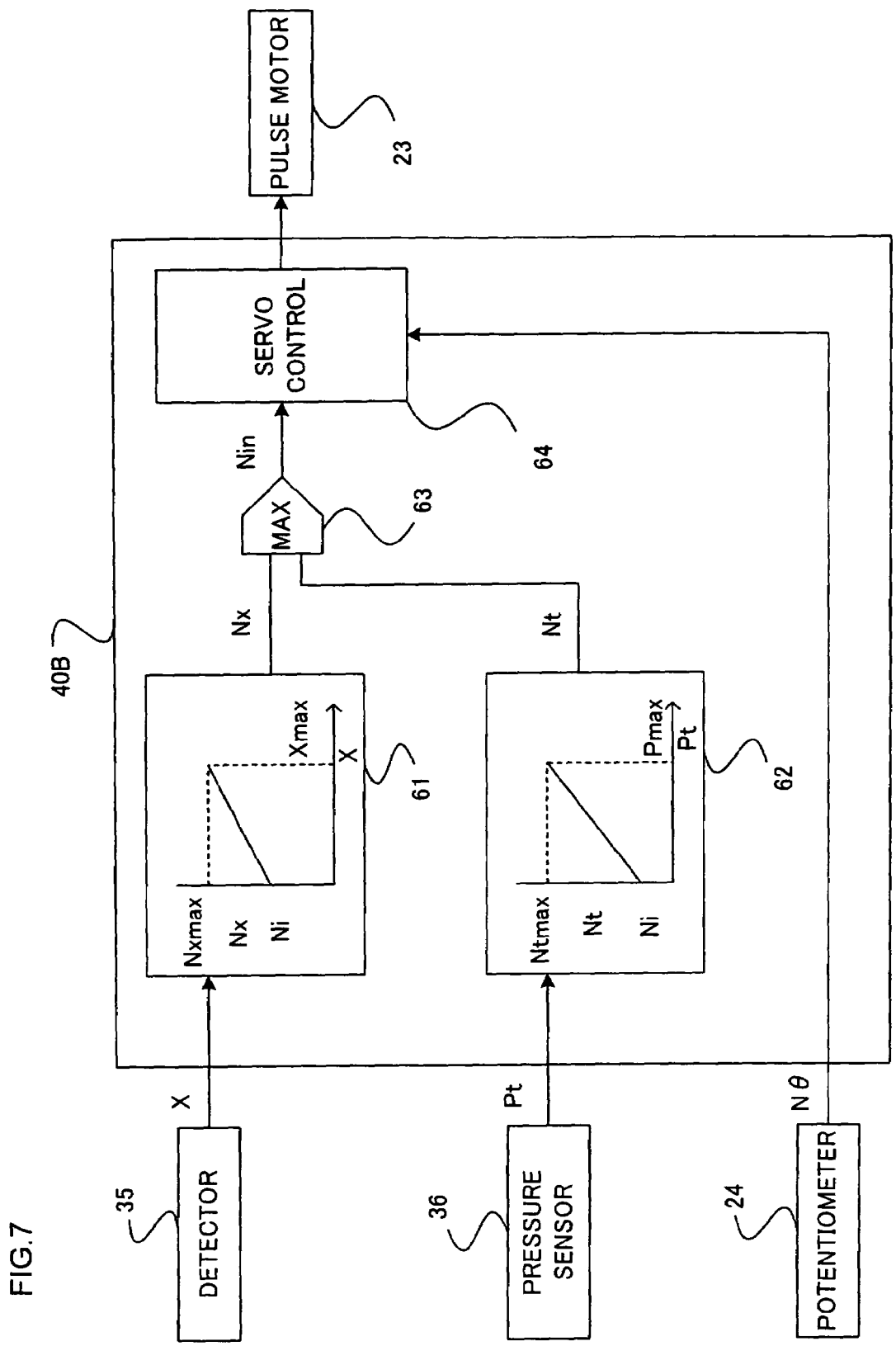
FIG. 7 shows in detail a control circuit for an engine rotation speed.

FIG. 7 is a conceptual diagram illustrating in detail the rotation speed control unit 40B. As shown in the figure, the relationship between the detection value X provided by the detector 35 and a target rotation speed Nx is stored in memory in advance at a target rotation speed calculation unit 61, and the target rotation speed Nx corresponding to the extent to which the fuel lever 34 is operated is calculated based upon the characteristics of the relationship. The relationship between the detection value Pt provided by the pressure sensor and a target rotation speed Nt is stored in memory in advance at a target rotation speed calculation unit 62 as shown in the figure, and the target rotation speed Nt matching the extent to which the travel pedal 14a is operated is calculated based upon the characteristics of the relationship.

These characteristics stored in the target rotation speed calculation units 61 and 62 each indicate linear increases in the target rotation speeds Nx and Nt from the idling rotation speed Ni as the extent of operation increases. A maximum target rotation speed Nxmax set at the target rotation speed calculation unit 61 is set smaller than a maximum speed of the engine 20, and a maximum target rotation speed Ntmax set at the target rotation speed calculation unit 62 is set substantially equal to the maximum speed of the engine 20. Therefore, the maximum target rotation speed Ntmax is larger than the maximum target rotation speed Nxmax.

The selection unit 63 selects the larger value between the target rotation speeds Nx and Nt calculated at the target rotation speed calculation units 61 and 62. A servo control unit 64 compares the selected rotation speed (rotation speed command value Nin) with the control rotation speed $N\theta$ corresponding to the displacement quantity of the governor lever 21 detected with the potentiometer 24. Then, it controls the pulse motor 23 through the procedure shown in FIG. 8 so as to match the two values.

First, the rotation speed command value Nin and the control rotation speed $N\theta$ are individually read in step S21 before proceeding to step S22 in FIG. 8. Then, in step S22, the results of subtracting Nin from $N\theta$ are stored as a rotation speed difference A in memory, and in step S23, a decision is made as to whether or not |A|≧K is true with regard to the rotation speed difference A and a predetermined reference rotation speed difference K. If an affirmative decision is made, the operation proceeds to step S24 to decide whether or not the rotation speed difference A is greater than 0. If A>0, the control rotation speed Nθ is greater than the rotation speed command value Nin, i.e., the control rotation speed is higher than the target rotation speed and, accordingly, a signal constituting a command for a motor reverse rotation is output to the pulse motor 43 in step S25 in order to lower the engine rotation speed. In response, the pulse motor 23 rotates in the reverse direction, thereby lowering the engine rotation speed.

If, on the other hand, A≦0, the control rotation speed Nθ is lower than the rotation speed command value Nin, i.e., the control rotation speed is lower than the target rotation speed and, accordingly, a signal constituting a command for a motor forward rotation is output in step S26 in order to raise the engine rotation speed. In response, the pulse motor 23 rotates forward, thereby raising the engine rotation speed. If a negative decision is made in step S23, the operation proceeds to step S27 to output a motor stop signal and, as a result, the engine rotation speed is sustained at a constant level. Once the processing in one of steps S25 through S27 is executed, the operation returns to the start point.

Next, the operation that characterizes the control device achieved in this embodiment is explained.

The brake switch 32 is set to the traveling position and the forward/backward switching valve 13 is switched to the forward or backward position when the vehicle is to travel. As the fuel lever 34 is set to the idling position and the travel pedal 14a is depressed to the maximum extent in this state, the traveling motor 5 is caused to revolve with the pressure oil discharged from the hydraulic pump 10 so as to allow the vehicle to start traveling. The selection unit 63 selects the target rotation speed Nt as the rotation speed command value Nin since the target rotation speed Nt set through the travel pedal 14a is greater than the target rotation speed Nx set through the fuel lever 34 at this time, and the governor lever position is controlled so as to match the actual rotation speed with the rotation speed command value Nin through the procedure shown in the FIG. 8. In response, the position of the governor lever 21 changes a great deal and the control rotation speed Nθ increases as indicated with the broken line shown in FIG. 9(a).

As the control rotation speed Nθ increases, the actual engine rotation speed Nr also increases, however, there is a time lag until the actual engine rotation speed Nr reaches the control rotation speed Nθ, causing the deviation ΔN to be a negative value during this period. In this case, the engine output torque T, characteristics of which are based on the characteristics shown in the FIG. 4, changes as shown in the FIG. 9(b).

The selection unit 52 selects the target input torque T2 during the vehicle traveling. Accordingly, the torque control unit 40A executes the speed sensing control based on the characteristics set at the correction torque calculation unit 45. Since the deviation |ΔN| is larger than the predetermined value N2 immediately after the beginning of the operation of the travel pedal 14a, the correction torque Δ T2 calculated at the correction torque calculation unit 45 shows a negative value. In this manner, the input torque T2 is set smaller than the output torque T when the vehicle is starting to travel as shown in the FIG. 9(b) so as to avoid the engine stall.

The negative correction torque ΔT2 decreases as the deviation |ΔN| decreases in response to the increase in the actual engine rotation speed Nr, and then the correction torque ΔT2 is set to 0 when the deviation |ΔN| becomes equal to the predetermined value N2 or smaller. By setting the correction torque ΔT to 0 before the deviation |ΔN| reaches 0 as described above, the input torque T2 can be brought back to the value corresponding to the standard torque TB2 quickly so as to achieve excellent acceleration. It is to be noted that even if the input torque T2 exceeds the output torque T for a short period of time during the increase of the input torque T2 as shown in FIG. 9(b), a difference (T−T2) between the output torque and the input torque is small enough not to cause any problems from a practical point of view. The above-mentioned embodiment can be adopted effectively to vehicles with a great load, therefore, it can be equally adopted, not only to a vehicle starting to travel, but also to a vehicle climbing uphill.

The characteristic T20 shown in FIG. 9(b) show conventional characteristics of the input torque by which the correction torque ΔT is uniformly maintained at 0 with the deviation ΔN being a negative value. According to this characteristics, the input torque T20 does not become smaller than the standard torque when the deviation ΔN is negative. In this manner, the engine input torque T20 exceeds the output torque T when the vehicle at which an engine coping with exhaust gas with a small output torque is mounted is starting to travel, and as a result the engine stall may occur.

To engage the vehicle in work, the brake switch 32 is set to the work position and the forward/backward switching valve 13 is set to the neutral position. The selection unit 63 of the rotation speed control unit 40B selects the target rotation speed Nx set through the fuel lever 34 as the rotation speed command value Nin if the fuel lever 34 is operated to a certain extent instead of operating the travel pedal 14a in this condition, and the governor lever position is controlled so as to match the actual rotation speed with the control speed command value Nin. At this time, the selection unit 52 of the torque control unit 40A selects the target input torque T1, and the torque control unit 40A executes the speed sensing control based on the characteristics set at the correction torque calculation unit 44. The input torque T1 is always smaller than the output torque T as shown in FIG. 9(c) because the correction torque ΔT corresponding to the negative deviation ΔN is calculated to be a negative value at the correction torque calculation unit 44.

According to the embodiment, the following advantages can be achieved.

(1) The correction torque ΔT2 is set to be a negative value if the deviation ΔN between the actual engine rotation speed Nr and the control rotation speed Nθ is negative and |ΔN| is greater than the predetermined value N2, and the correction torque ΔT2 is set to be 0 if the |ΔN| is equal to or less than the predetermined value N2. By doing this, the input torque T2 can be set smaller than the output torque T when the vehicle is starting to travel even if the engine coping with exhaust gas is installed therein, and thus the engine stall can be prevented from happening and excellent acceleration can be obtained.

(2) The inclination of the correction torque ΔT corresponding to the negative deviation ΔN with |ΔN| being greater than the predetermined value N2 is set to be greater than the inclination of the correction torque ΔT corresponding at least to the deviation ΔN which is a positive value. Accordingly, the input torque T2 can be brought back to the standard torque TB2 quickly as the deviation ΔN approaches the predetermined value N2, and the hunting can be prevented from occurring when the deviation ΔN is a positive value.

(3) The characteristics based upon which the correction torques ΔT are calculated in a traveling state and in a non-traveling state of the vehicle are set individually, and since the acceleration performance does not count so much in the non-traveling state, the correction torque ΔT is set to be a negative value when the deviation ΔN is negative. As a result, the input torque T1 can be maintained smaller than or equal to the output torque T when the vehicle is engaged in work operations.

While the correction torque ΔT2 is set to 0 when the deviation ΔN is in the range of N2≦ΔN≦0 according to the above-described embodiment, the correction torque ΔT2 does not have to be set to 0 as long as the characteristics of the correction torque ΔT2 is defined such that the inclination of the correction torque ΔT2 corresponding to the negative deviation ΔN has two different levels with reference to the predetermined value N2.

While the explanation is given on an example to ensure the acceleration performance of the traveling hydraulic motor 5 during traveling, the present invention is not to be limited to this example and may be applied, for instance, to a revolving hydraulic motor that revolves the revolving superstructure. Accordingly, an operation means is also not limited to the travel pedal 14a.

INDUSTRIAL APPLICABILITY

While an explanation is given above on an example in which a wheeled hydraulic excavator represents an example of a construction machine in which the present invention may be adopted, the present invention may also be adopted in other types of construction machines such as non-wheel construction machines.

The invention claimed is:

1. A control apparatus of a construction machine that includes:
   a variable displacement hydraulic pump driven by a prime mover;
   a hydraulic actuator driven with pressure oil discharged from the hydraulic pump; and
   a rotation speed detection device that detects an actual rotation speed of the prime mover, comprising:
   a prime mover control device that controls a rotation speed of the prime mover in accordance with an extent to which an operating member is operated; and
   an input torque control device that adjusts an input torque for the hydraulic pump based on a deviation between the actual rotation speed detected by the rotation speed detection device and a control rotation speed set through an operation of the operating member, wherein:
   the input torque control device executes control to decrease the input torque if the control rotation speed is greater than the actual rotation speed and the deviation calculated by subtracting the control rotation speed from the actual rotation speed is more negative than a predetermined negative value.

2. A control apparatus of a construction machine according to claim 1, wherein:
   the input torque control device sets an adjustment amount of the input torque to zero if the control rotation speed is greater than the actual rotation speed and the deviation calculated by subtracting the control rotation speed from the actual rotation speed is less negative than the predetermined negative value.

3. A control apparatus of a construction machine according to claim 1, wherein:
   the input torque control device executes control to increase the input torque in correspondence with increase in the deviation if the control rotation speed is smaller than the actual rotation speed, and
   if the control rotation speed is greater than the actual rotation speed and the deviation calculated by subtracting the control rotation speed from the actual rotation speed is more negative than the predetermined negative value, a rate of change of the input torque is set greater than a rate of change of the input torque set when the control rotation speed is smaller than the actual rotation speed.

4. A control apparatus of a construction machine according to claim 1, wherein:
   the hydraulic actuator is a hydraulic motor for traveling, and the operating member is a travel pedal.

5. A control apparatus of a construction machine according to claim 4, further comprising:
   a travel detection device that detects traveling and non-traveling, wherein:
   if the non-traveling is detected with the travel detection device when the control rotation speed is greater than the actual rotation speed, the input torque control device decreases the input torque by an amount which is greater than an amount set when the traveling is detected.

6. A wheeled hydraulic excavator, comprising:
   a control apparatus according to claim 1.

7. A control apparatus of a construction machine that includes:
   a variable displacement hydraulic pump driven by a prime mover;
   a hydraulic actuator driven with pressure oil discharged from the hydraulic pump; and
   a rotation speed detection device that detects an actual rotation speed of the prime mover, comprising:
   a prime mover control device that controls a rotation speed of the prime mover in accordance with an extent to which an operating member is operated; and
   an input torque control device that adjusts an input torque for the hydraulic pump based on a deviation between the actual rotation speed detected by the rotation speed detection device and a control rotation speed set through an operation of the operating member, wherein:
   if the control rotation speed is greater than the actual rotation speed and the deviation calculated by subtracting the control rotation speed from the actual rotation speed is more negative than a predetermined negative value, the input torque control device executes control to decrease the input torque by an amount which is greater than an amount set when the deviation is less negative than the predetermined negative value.

8. A control apparatus of a construction machine according to claim 7, wherein:
   the input torque control device sets an adjustment amount of the input torque to zero if the control rotation speed is greater than the actual rotation speed and the deviation calculated by subtracting the control rotation speed from the actual rotation speed is less negative than the predetermined negative value.

9. A control apparatus of a construction machine according to claim 7, wherein:
   the input torque control device executes control to increase the input torque in correspondence with increase in the deviation if the control rotation speed is smaller than the actual rotation speed, and
   if the control rotation speed is greater than the actual rotation speed and the deviation calculated by subtracting the control rotation speed from the actual rotation speed is more negative than the predetermined negative value, a rate of change of the input torque is set greater than a rate of change of the input torque set when the control rotation speed is smaller than the actual rotation speed.

10. A control apparatus of a construction machine according to claim 7, wherein:
the hydraulic actuator is a hydraulic motor for traveling, and the operating member is a travel pedal.

11. A control apparatus of a construction machine according to claim 10, further comprising:
a travel detection device that detects traveling and non-traveling, wherein:
if the non-traveling is detected with the travel detection device when the control rotation speed is greater than the actual rotation speed, the input torque control device decreases the input torque by an amount which is greater than an amount set when the traveling is detected.

12. A wheeled hydraulic excavator, comprising:
a control apparatus according to claim 7.

13. A method for calculating an input torque which is implemented by a hydraulic circuit including at least a variable displacement hydraulic pump driven by a prime mover and a hydraulic actuator driven with pressure oil discharged from the hydraulic pump, comprising:
calculating a standard torque in correspondence with a deviation between a control rotation speed and an actual rotation speed of the prime mover;
setting a correction torque to zero if the control rotation speed is greater than the actual rotation speed and the deviation calculated by subtracting the control rotation speed from the actual rotation speed is less negative than a predetermined negative value, but setting the correction torque to a negative value if the deviation is more negative than the predetermined negative value; and
calculating the input torque by adding the correction torque to the standard torque.

* * * * *